March 21, 1961
S. C. JOHNSON
2,976,480
AUTOMATIC CONTROL SYSTEM FOR DISTRIBUTION
CIRCUIT CAPACITORS
Filed Feb. 19, 1958
3 Sheets-Sheet 1
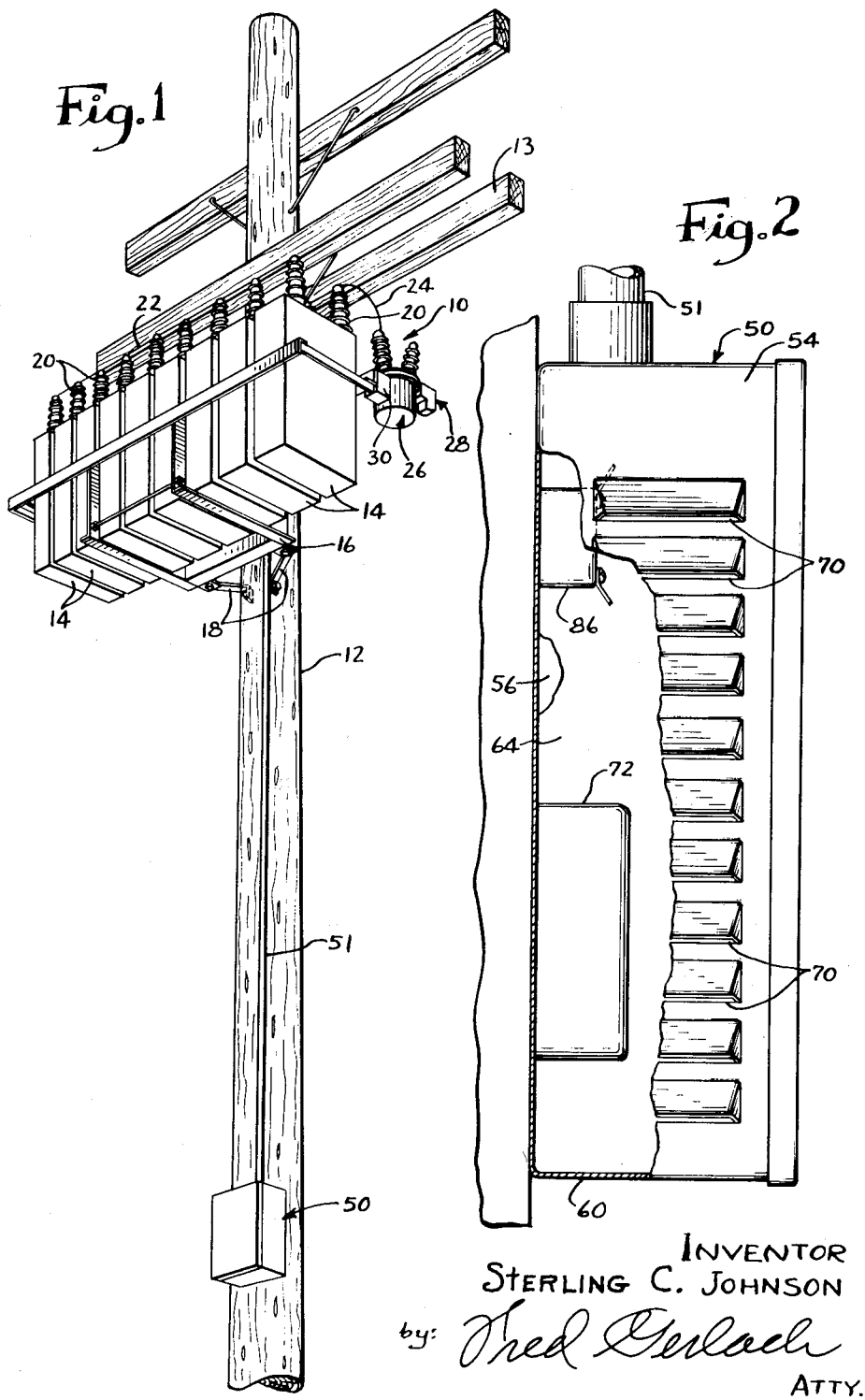
INVENTOR
STERLING C. JOHNSON
by: Fred Gerlach
ATTY.

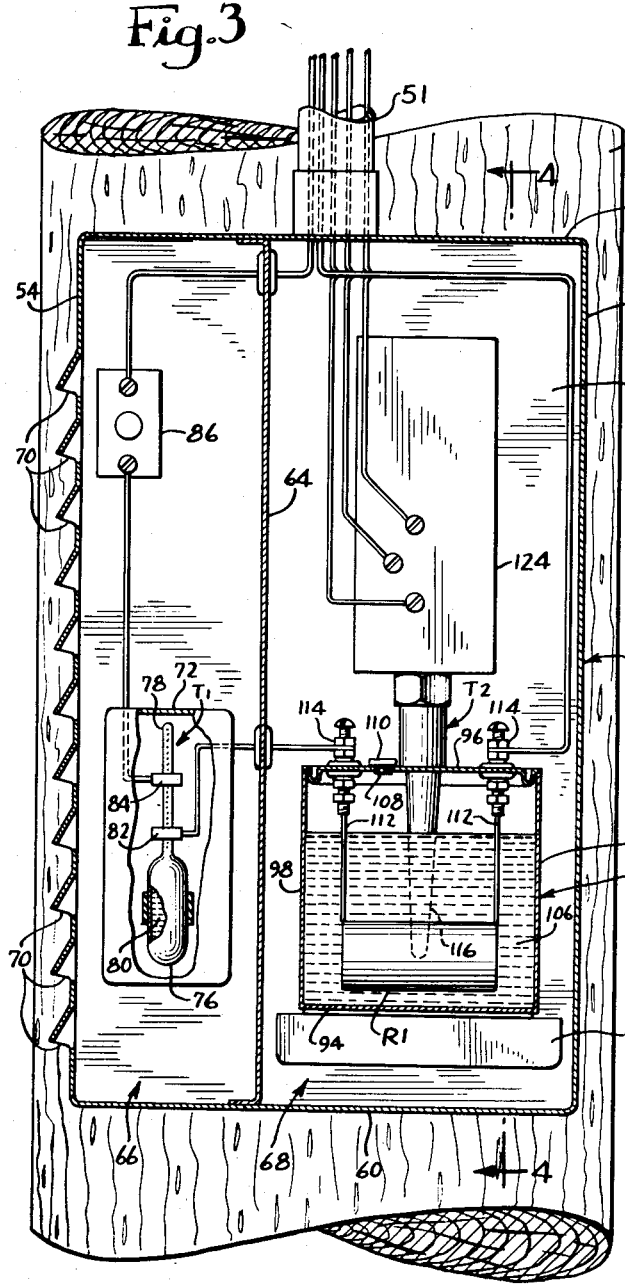
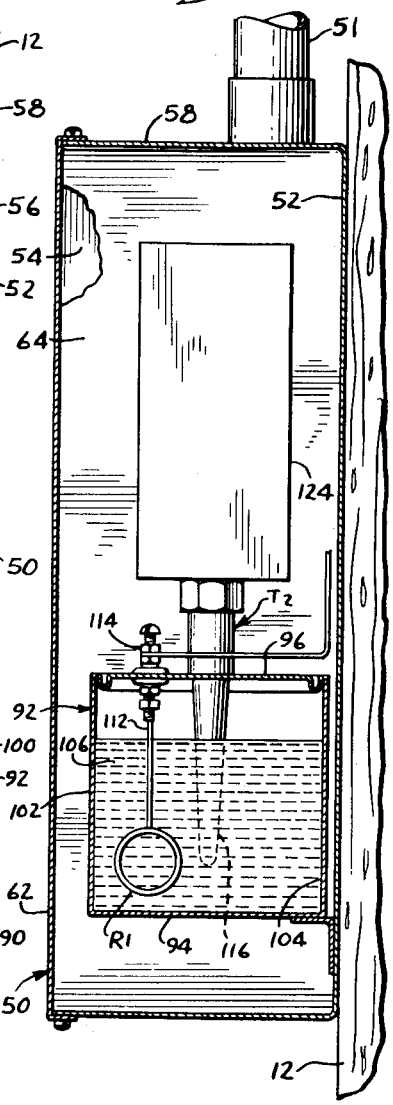

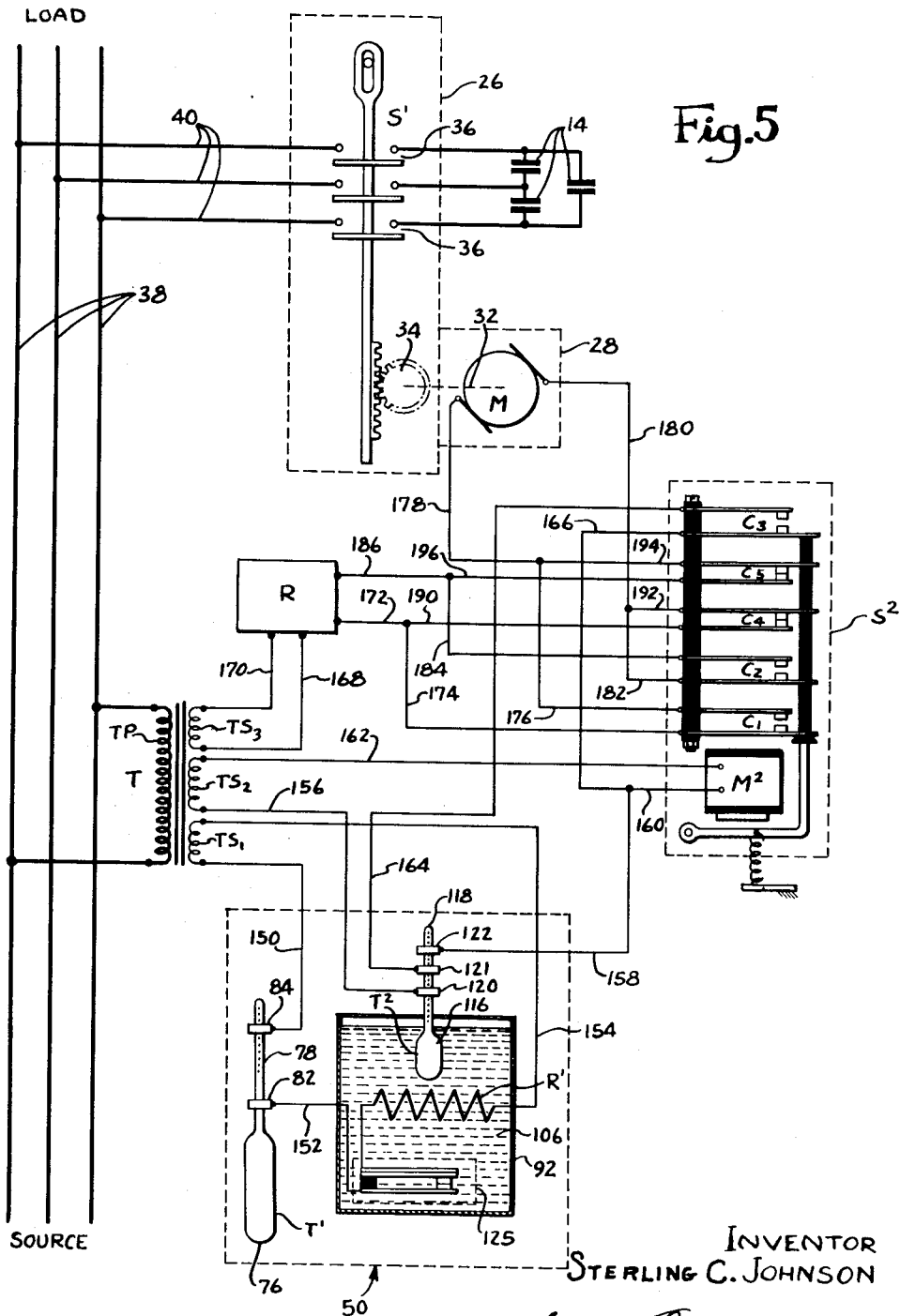

# United States Patent Office

2,976,480
Patented Mar. 21, 1961

2,976,480

AUTOMATIC CONTROL SYSTEM FOR DISTRIBUTION CIRCUIT CAPACITORS

Sterling C. Johnson, 1841 S. 13th St., Abilene, Tex.

Filed Feb. 19, 1958, Ser. No. 716,078

4 Claims. (Cl. 323—106)

The present invention relates to automatic switching systems and has particular reference to an improved control mechanism designed for use in connection with automatic switching apparatus such as is commonly employed for connecting capacitors to a power or distribution circuit.

The selective and automatic connection of auxiliary capacitors in a distribution circuit to supplement fixed capacitors in order to reduce peak load losses on the distribution feeder and throughout the system is widely resorted to to compensate for the constantly increasing spread between conditions of light load and peak load. Due mainly to the increase in the use of air conditioning equipment, the use of such automatic switching equipment has been found necessary to reduce the voltage drop from the generator to the load areas as well as between the first and last distribution transformers in the system. Various types of switching means have been designed for effecting the actual connection of the capacitor banks into and removal of the banks from the system and, among these, the use of a reversing switch operable under the control of a small reversible electric motor has come into almost universal acceptance. Similarly, where motor-actuated switching mechanism is employed for capacitor switching purposes, various methods of motor control are in use, including voltage sensitive, current sensitive, temperature sensitive, and time controlled systems, as well as various combinations of these factors.

Such voltage, current and time controlled systems are possessed of numerous limitations, principal among which is the fact that these systems fail to take into consideration the time lag which exists in any given community as between an ambient or outdoor temperature change and the consequent subsequent indoor temperature change which dictates the use of a particular electrical installation or the discontinuance of such use. For example, where air conditioning apparatus is concerned, a given ambient temperature rise, whether sudden or over a fairly long period of time, will not immediately be reflected within a dwelling or office building and the existing air conditioning equipment will, therefore, not be put into service until such time as there is a demand therefor as reflected by the sensitivity of the occupants of the dwelling or building. Tests by utility companies have indicated that a requirement curve invariably lags behind a curve which is plotted against time and temperature, although the two curves possess the same general pattern. Systems which fail to recognize these principles are subject to the serious limitation that if ambient temperature conditions result in the addition of a capacitor bank to any given distribution feeder circuit prior to the expected loading of that circuit, an economical power factor cannot be maintained at the conditions of light load involved. Conversely where needed, capacitors are removed from a distribution circuit because ambient temperature conditions are a controlling factor and an economical power factor under the consequent conditions of high load cannot be maintained.

The present invention is designed to overcome the above-noted limitations that are attendant upon the use of present day capacitor switching systems and, toward this end, it contemplates the provision of a control system for effecting automatic operation of a capacitor switching mechanism, for example, a conventional pole-top switch assembly and reversible electric operating motor therefor, wherein the actual capacitor switching operations for the purpose of adding capacitors to a distribution circuit or of removing capacitors from such circuit is performed on the basis of a time lag which closely simulates the time lag involved between outside and inside temperature conditions over a wide range of temperature differentials, as outlined above, in a typical inhabitable enclosure which will be representative of the average time lag for all inhabitable units in a given feeder circuit.

The provision of a control system of this character being among the principal objects of the invention, it is a further object to provide such a system wherein the temperature-sensitive equipment involved is of an extremely compact nature and is capable of being operatively installed in a conveniently accessible position on a power line pole in the vicinity of the various capacitor banks, the switching operation of which it controls.

In carrying out the above mentioned objects, the invention, in the form thereof selected for illustration herein, contemplates the provision of a control box or housing adapted to be fixedly mounted on a selected power line pole at a convenient access level. A partition wall within the housing divides the same into a closed and substantially sealed compartment and a louvered compartment which is in communication with the outside or ambient atmosphere. The housing has operatively mounted therein the electrical instrumentalities which cooperate to make up the present control system and these include a first thermally responsive element and a resistance heating element disposed in series relationship in a primary electric circuit. The thermally responsive element is disposed in the louvered compartment and is thus responsive to ambient temperature while the heating element is disposed within a body of liquid contained within a sealed container enclosed within the closed or shielded compartment. A second thermally responsive element is submerged in the body of liquid and is operatively connected in a secondary circuit to a relay-actuated reversing switch which controls the direction of current flow to the electric motor by means of which the various capacitors are switched into and out of the distribution circuit. The two thermally responsive elements are designed to establish their primary and secondary circuits respectively when they are subjected to respective predetermined maximum temperatures and these temperatures may be chosen so that the desired time lag, as briefly outlined above, will take place between energization of the primary circuit and the secondary circuit as represented by the length of time required for the body of liquid to attain the necessary temperature rise for actuation of the second thermally responsive element. In this manner actual capacitor switching-in operations will not be effected until the desired time lag has taken place after the predetermined maximum ambient temperature has been attained, and in the event that the ambient temperature falls below such predetermined temperature before the desired time lag has elapsed, such switching-in operations will not take place. Conversely, and of equal importance, capacitor switching-out operations will be subject to a time lag which is a function of the time required for the body of liquid to cool from any elevated temperature to which it may have been heated from a previous heating operation to a predetermined minimum temperature for which the second thermally responsive element has been set.

A still further object of the invention, in a system of this character, is to provide an effective and simple means whereby the duration of the time lag between energization or deenergization of the primary and secondary control circuits, respectively, as the case may be, may be varied at will within practical operating limits.

The provision of a control system for initiating selective actuation of a capacitor switching motor under the control of a thermally responsive element, which system is extremely simple in its construction and which, therefore, may be manufactured at a relatively low cost; one which, in the main, is comprised of commercially available parts, units or assemblies, thereby further contributing toward low cost of manufacture; one which is comprised of a minimum number of moving parts and which is, therefore, unlikely to get out of order; one which is rugged and durable and which, therefore, is well suited for outdoor installation; one which is capable of ease of assembly and installation; one which requires practically no maintenance after its initial installation; one which may be manufactured as original equipment or which may be readily applied to existing capacitor switching apparatus without requiring appreciable modification thereof; and one which is otherwise well adapted to perform the services required of it are further desirable features which have been borne in mind in the production and development of the present invention.

In the accompanying three sheets of drawings forming a part of this specification, one illustrative embodiment of the invention has been shown.

In these drawings:

Fig. 1 is a fragmentary perspective view of a power line pole on which there has been operatively installed a bank of capacitors and showing the improved switch control mechanism of the present invention operatively associated with such capacitors;

Fig. 2 is a side elevational view of a control box structure employed in connection with the present invention. In this view, a portion of the side wall of the control box has been broken away to more clearly reveal the nature of the invention;

Fig. 3 is a sectional view taken substantially along the line 3—3 of Fig. 2;

Fig. 4 is a sectional view taken substantially along the line 4—4 of Fig. 3; and Fig. 5 is a circuit diagram, schematically illustrating the electrical connections of the present control system.

Referring now to the drawings in detail and in particular to Fig. 1, a pole-top installation of capacitors has been designated in its entirety at 10, the installation being made on the upper regions of a conventional power line pole 12 below the various wire supporting cross arms 13. The installation selected for illustration herein is purely conventional and includes a bank of individual capacitors 14, the capacitors being arranged in a single row and being carried in a rack assembly 16 supported on a pole mounting bracket 18 operatively affixed to the pole 12. The capacitors are shown as having rubber insulated terminals 20. The capacitors 14 are electrically connected as at 22 to one another in the usual manner of connection of such capacitors and the bank of capacitors is electrically connected as at 24 to a switch mechanism which has been designated in its entirety at 26 (see also Fig. 5) and which is operable under the control of a reversible electric motor assembly 28 to automatically connect the capacitors 14 to the distribution circuit associated with the pole 12 or to disconnect the capacitors therefrom. The switch assembly 26 and motor assembly 28 are fixedly secured to each other in operative relationship and constitute a package type unit adapted to be supported from the capacitor supporting bracket 16 by means of a suitable attachment plate 30.

The arrangement of parts described above is purely conventional and no claim is made herein to any novelty associated with the same. For illustrative purposes in Fig. 5, the electric motor M associated with the assembly 28 is schematically shown as being connected by a system of gearing 32 to a rack and pinion device 34 which controls the opening and closing movements of a capacitor switch proper S1 including a series of individual switch contacts 36 by means of which the various capacitors 14 may be applied to or removed from the conductors 38 which comprise the power line, through suitable connecting conductors 40. It is to be distinctly understood that the illustration of Fig. 5 is purely schematic and exemplary and that other forms of switch devices S1, motors M, and connections 34 may be utilized for switching the capacitors 14 into and out of the distribution circuit 38. Among such alternative devices, solenoid motors, latch type switch devices and the like are contemplated. One form of capacitor switch equipment with which the control system of the present invention is particularly well adapted for use is manufactured by the General Electric Company of Schenectady, New York and has been illustrated and described in a brochure designated GEA-6543 published in August of 1957 and reference may be had to this publication for a more detailed disclosure of the system. The present invention resides in a control system by means of which the reversible motor M may be selectively energized to introduce the various capacitors 14 into the distribution circuit 38 or to remove them from this circuit all in a manner that will be now more fully described.

Referring now to Figs. 1 to 4, inclusive, the control mechanism of the present invention is operatively mounted within a generally rectangular metallic housing or box 50 and these instrumentalities are operatively and electrically connected to the motor assembly 28 through a conduit 51 extending between the housing 50 and assembly 28. The housing or box 50 is of generally rectangular design and includes a rear wall 52, vertical side walls 54 and 56, a top wall 58, a bottom wall 60, and a removable front wall or cover plate 62. A vertical partition 64 extends between the rear wall 52 and cover plate 62 and divides the interior of the housing into two adjacent compartments including a relatively narrow compartment 66 (Fig. 3) and a relatively wide compartment 68. The compartment 68 is adapted to be substantially sealed from the ambient atmosphere when the cover plate 62 is in position while the compartment 66 is open to the atmosphere through a series of louvres 70 for purposes that will be made clear presently.

Suitably mounted in a fixture 72 by means of a bracket 74 secured to the fixture is a thermally responsible element which may be in the form of a mercury column-type thermostat T1, hereinafter referred to as the primary thermostat and including the usual bulb portion 76 and stem portion 78. The bulb portion 76 contains a quantity 80 of a conductive fluid such as mercury having a relatively high coefficient of thermal expansion, the mercury being adapted to rise in the stem portion 78 of the thermostat assembly upon an increase in ambient temperature and to establish electrical contact between a pair of contact terminals, including a fixed terminal 82 and an adjustable terminal 84, when a predetermined maximum temperature has been attained. A terminal connector device 86 is mounted on one wall of the compartment 66 for detachable electrical connection of the circuit wires associated with the primary thermostat T1.

Suitably mounted on a supporting bracket 90 within the compartment 68 is a sealed container 92 having a bottom wall 94, a top wall 96, side walls 98 and 100, respectively, a front wall 102 and a rear wall 104. The container 92 is adapted to contain a body of liquid 106 of a non-conductive nature as, for example, ordinary transformer oil and the top wall 96 of the container is provided with a filling opening 108 having a removable cap 110 associated therewith and by means of which opening the liquid 106 may be introduced into the container or withdrawn therefrom utilizing suitable suction means whereby the total volume of liquid within the container 92 may be varied for purposes that also will be made clear presently. The body of liquid 106 is thermally insulated from the ambient atmosphere surrounding the outer housing 50 by the dead air space within the housing between the walls of the two enclosures and thus it will be obvious that the temperature of the body of liquid 106 will vary as ambient temperatures fluctuate, with an appreciable time lag being involved before the temperature of the body of liquid 106 will attain the ambient temperature, this time lag, of course, being a direct function of the temperature differential involved. An electrical resistance heating unit R1 is submerged within the body of liquid 106 and is suspended within the body by means of suitable conductor elements or strips 112 the upper ends of which are electrically connected to insulating terminals 114. As will appear presently, the resistance unit R1 is adapted to be electrically connected in series with the thermostat device T1 in a primary circuit the energization of which is dependent upon ambient temperature conditions surrounding the compartment 68 as reflected by the operation of the thermostat T1 which is exposed to the ambient atmosphere as previously described. A second thermostat T2 which may also be of the mercury column type, is provided with a bulb portion 116 which extends into and is submerged in the body of liquid 106. The stem portion 118 of this thermostat is provided with a plurality of contact terminals including a stationary contact 120 and two adjustable contacts 121 and 122, respectively (Fig. 5). The thermostat T2 is provided with a terminal strip 124 to facilitate electrical connection of the thermostat to a source of energizing current, as well as to a reversible switch assembly S2 which in turn is operatively connected to the motor M for control purposes so that the motor may be selectively energized for operation in opposite directions to control the capacitor switching-in and switching-out operations of the switch assembly S1. The reversing switch S2 may be of any suitable type, an exemplary form of switch being schematically shown in Fig. 5. This switch is preferably positioned at a remote location, although if desired it may be mounted in the compartment 68 with terminal connections therefor being provided on the terminal strip 124. Irrespective, however, of the particular location of the switch assembly S2, the essential features of the present control system are not destroyed.

The thermostat T2 is operatively connected in a secondary circuit in series with a relay magnet M2 (Fig. 5) forming a part of the relay actuated switch S2. The thermostat T2 may be similar in its construction to the thermostat T1 and the bulb portion thereof is adapted to contain a body of conducting fluid such as mercury capable of establishing electrical contact between the various terminals 120, 121 and 122 when these terminals are bridged by the rising column of liquid in the stem portion 118 of the thermostat. The adjustable terminal 84 of the thermostat T1 is adapted to be set for energization of its respective primary circuit when a predetermined maximum ambient temperature is attained. The adjustable terminal 122 of the thermostat T2 is adapted to be set for energization of its respective secondary circuit when a predetermined maximum internal temperature is attained in the body of the liquid 106. The particular maximum temperatures selected will be chosen in accordance with engineering expediencies to attain a desired result but, in general, due to the fact that the body of liquid 106 within the container 92 is capable of being artificially heated upon energization of the resistance unit R1, the temperature setting for the contact 122 will be somewhat higher than the setting for the contact terminal 84 to attain operational results that will become apparent when the description of the operation of the control system is set forth. A pair of normally closed thermally responsive contacts 125 which may be of the bi-metallic type, may be submerged in or otherwise caused to be thermally responsive to the body of liquid 106 and are adapted to become open when a predetermined maximum temperature is attained within the body of liquid 106 to prevent overheating thereof.

Referring now to Fig. 5 wherein the operation of the control system has been schematically and diagrammatically illustrated, current for energization of the primary circuit, including the contacts 82 and 84 of the thermostat T1 and the heater or resistance unit R1, may be supplied from any suitable source as, for example, from the secondary winding TS1 of a transformer T having a primary winding TP. The transformer T may be conveniently located on the power line pole 12 in the vicinity of the power line 38. The primary circuit extends from the secondary winding TS1, through lead 150, contact 84, the mercury column of the thermostat T1, contact 82, lead 152, contacts 125, heating unit R1 and lead 154 back to the winding TS1. As long as the ambient temperature, as reflected by the temperature within the louvred compartment 66, remains below the predetermined ambient temperature for which the thermostat T1 has been set, the primary circuit will remain deenergized but, when the predetermined ambient temperature has been attained, energization of the circuit will take place thus energizing the resistance heater R1 whereupon heat will be applied to the body of liquid 106 within the container 92. As the temperature of the body of liquid 106 within the container 92 rises under the influence of the heating effect of the resistance heater unit R1, the column of mercury in the thermostat T2 will rise and at such time as it bridges the contacts 120 and 122, a secondary electrical circuit will be established through the relay magnet M2 associated with the reversing switch S2. This circuit exists from the secondary winding TS2 of the transformer T, through lead 156, contacts 120, 122, leads 158, 160, magnet M2 and lead 162 back to the winding TS2. Energization of the magnet M2 will cause closure of three pairs of normally open contacts C1, C2 and C3, respectively, and opening of two pairs of normally closed contacts C4 and C5, respectively. Closure of the contacts C3 will establish a holding circuit through the magnet M2, this circuit extending from the secondary winding TS2 through lead 156, contacts 120, 121 (bridged by the mercury column during its initial rise prior to its engagement with the contact 122), lead 164, contact C3, leads 166, 160, magnet M2, and lead 162 back to the winding TS2. This holding circuit will remain effective until such time as the mercury column falls below the level of the contact terminal 121. Closure of the contacts C1 and C2 will establish an electrical circuit through the motor M thus causing the motor shaft and gearing 32 to be actuated in such a manner as to effect closure of the capacitor switch S1 through the medium of the rack and pinion device 34. The current supplied to the motor M may be direct current supplied by a rectifier device R disposed in a local circuit extending from the secondary winding TS3 of the transformer T through leads 168, rectifier R and lead 170 back to the winding TS3. The motor circuit extends from the rectifier through leads 172, 174, contacts C1, leads 176, 178, motor M, leads 180, 182, contacts C2 and leads 184, 186 back to the rectifier R.

It is to be noted at this point that after an initial energization of the primary circuit extending through the mercury column of the thermostat T1, and before such time as the body of liquid 106 in the container 92 has attained an internal temperature of sufficient magnitude to establish the secondary circuit just described extending through the motor M, the ambient temperature falls to such an extent that the contacts 82 and 84 become electrically disconnected, the resistance unit R1 will become deenergized so that no further rise in the column of mercury associated with the thermostat T2 will take place. Any initial bridging of the contacts 120 and 121 by the mercury column will be without effect inasmuch as the contacts C3 of the switch S2 are normally open and become closed to effect a holding circuit for the magnet M2 only after this magnet has become initially energized by a bridging of the contacts 120 and 122.

It will be understood, of course, that when the ambient temperature surrounding the thermostat T1 is below the predetermined maximum temperature for which the thermostat T1 is set, the primary circuit including the resistance unit R1 will remain deenergized so that the temperature within the body of liquid 106 will normally remain substantially the same as the ambient temperature by virtue of a gradual dissipation through the walls of the container 92 and the dead air space within the outer container 50. At such time, an electric circuit for the motor M will remain effective to maintain the contacts of the switch S1 open, such circuit extending from the rectifier R through leads 172, 190, contacts C4, leads 192, 180, leads 178, 194, contacts C5, and leads 196, 186 back to the rectifier R. The capacitors 14 are thus normally maintained disconnected from the distribution circuit 38 when the ambient temperature surrounding the thermostat T1 is below the predetermined maximum temperature for which the contact 84 is set.

The reversing switch S2 illustrated herein for exemplary purposes is so designed that, in the normally deenergized condition of its controlling relay magnet M2, the contacts C4 and C5 will be closed, thus causing energization of the motor M in such a manner as to exclude the capacitors 14 from the distribution circuit 38. Immediately upon energization of the relay magnet M2, the contacts C4 and C5 will become open while the contacts C1 and C2 will become closed to energize the motor in such a manner that the capacitors 14 will be switched into the distribution circuit 38. The motor M preferably draws but little current so no appreciable current drain is encountered by maintaining the motor constantly energized. However, if desired, additional circuitry may be embodied in the motor circuit whereby the motor will automatically become deenergized when the switch S1 attains either its fully open or its fully closed condition. Circuitry of this character is well known and ordinarily involves various cam controlled contacts operated by the motor armature shaft, as well as relay-actuated shunt contacts for rendering the cam controlled contacts ineffective to initiate motor operation. Such an arrangement has been omitted from the present disclosure since it is non-essential to the proper functioning of the control system as illustrated and described herein.

The invention is not to be limited to the exact arrangement of parts shown in the accompanying drawings or described in this specification since various changes in the details of construction may be resorted to without departing from the spirit of the invention. For example, although the two thermostats T1 and T2 have been illustrated herein as being of the mercury column type, it will be distinctly understood that other forms of thermostats such as thermostats of the bi-metallic type having provision for regulating the setting of its terminal contacts or for otherwise altering its cut-in and cut-out points may be employed. Similarly, although in the illustrated embodiment of the invention, specific forms of the reversing switch S2, the mechanically actuated capacitor switch S1, the reversing switch S2, and the current supplying devices T and R have been illustrated herein, it will be understood that the illustrations are purely exemplary and that other forms of such devices may be employed if desired. The illustrated structure, however, constitutes one operative embodiment of the invention, the principal feature of which resides in the provision of an effective and novel means for creating a time lag between an initial energization or deenergization, as the case may be, of the primary circuit including the thermostat T1 and the secondary circuit including the thermostat T2, this time lag being predicated upon the quantity of liquid 106 enclosed within the sealed container 92, the ohmic value of the heating resistance, the value of current supplied thereto by the secondary winding TS1 and other factors which affect the rate of heating of the body of liquid or the cooling thereof after the temperature of the same has been raised above the predetermined maximum. Therefore, only insofar as the invention has particularly been pointed out in the accompanying claims is the same to be limited.

Having thus described the invention what I claim as new and desire to secure by Letters Patent is:

1. In a switching system for connecting and disconnecting a capacitor to and from a distribution circuit respectively, the combination with a capacitor switch and a reversible electric actuator therefor, of control means for said actuator comprising a primary thermostat responsive to outdoor ambient temperature, a normally deenergized primary electric circuit for said thermostat, contact means for said thermostat operable when a predetermined maximum ambient temperature has been attained to effect energization of said primary circuit, a control circuit for said actuator, a reversing switch in said control circuit, a closed receptacle containing a thermally conductive body of a liquid having a relatively slow thermal response to changes in ambient temperature, a second thermostat responsive to temperature fluctuations in said thermally conductive body, means operatively connecting said second thermostat and reversing switch for actuating the reversing switch in a direction to connect the capacitor in the distribution circuit when said thermally conductive body attains a predetermined maximum temperature higher than said first mentioned maximum temperature and for actuating the reversing switch in the other direction to disconnect the capacitor from the distribution circuit when the temperature of said thermally conductive body falls below a predetermined minimum temperature lower than said first mentioned maximum temperature after having attained said predetermined higher maximum temperature, and a resistance heater in said primary circuit and disposed in heat exchange relation to the liquid of said thermally conductive body.

2. In a switching system for connecting and disconnecting a capacitor to and from a distribution circuit respectively, the combination set forth in claim 1 including additionally a pair of normally closed thermally responsive contacts in said primary circuit and arranged in heat exchange relationship to said thermally conductive body, said thermally responsive contacts being adapted to become open when the temperature of said thermally conductive body rises above a predetermined maximum higher than said first mentioned maximum temperature.

3. In a switching system for connecting a capacitor to a distribution circuit connecting a load and a source, the combination with a capacitor switch and a reversible electric motor operatively connected to the switch to effect opening and closing movements of the latter, of control means for controlling the flow of current to said motor and comprising a primary thermostat responsive to outdoor ambient temperature, a normally deenergized primary electric circuit for said thermostat, contact means for said thermostat operable when a predetermined maximum ambient temperature has been attained to effect energization of said primary circuit, a motor circuit, a relay-actuated reversing switch operatively disposed in said motor circuit, a relay magnet operable upon deenergization thereof to actuate the reversing switch in the opposite direction, an actuating circuit for said magnet, a holding circuit for said actuating circuit, a thermally conductive static body of liquid having a relatively slow thermal response to ambient temperature changes, a second thermostat responsive to temperature fluctuations in said body of liquid, said second thermostat being of the mercury column type and having a bulb portion submerged in said body of liquid, first, second and third contacts for said second thermostat adapted upon a temperature rise in said body of liquid to be engaged by the column of mercury associated with said latter thermostat in the order named, said first and third contacts being operatively disposed in said magnet actuating circuit, said first and second contacts being operatively disposed in said holding circuit for the magnet, and a resistance element in said primary circuit and submerged in said body of liquid.

4. In a switching system for connecting and disconnecting a capacitor to and form a distribution circuit respectively, the combination with a capacitor switch and a reversible electric actuator therefor, of control means for said actuator comprising a primary thermostat responsive to outdoor ambient temperature, a normally deenergized primary electric circuit for said thermostat, adjustable contact means for said thermostat operable when a predetermined maximum ambient temperature has been attained to effect energization of said primary circuit, a control circuit for said actuator, a reversing switch in said control circuit, a closed receptacle containing a thermally conductive static body of liquid having a relatively slow thermal response to changes in ambient temperature, a second thermostat responsive to temperature fluctuations in said thermally conductive body, adjustable contact means for said second thermostat operatively connected to the reversing switch for actuating the latter in a direction to connect the capacitor in the distribution circuit when said thermally conducted body attains a predetermined maximum temperature higher than said first mentioned maximum temperature and for actuating the reversing switch in a direction to disconnect the capacitor from the distribution circuit when the temperature of said thermally conductive body falls below a predetermined minimum temperature lower than said first mentioned maximum temperature after having attained said predetermined higher maximum temperature, and a resistance heater in said primary circuit and disposed in heat exchange relation to said thermally conductive body.

References Cited in the file of this patent

UNITED STATES PATENTS

| | | |
|---|---|---|
| 2,337,476 | Landon | Dec. 21, 1943 |
| 2,434,347 | Breese | Jan. 13, 1948 |
| 2,449,858 | Ottmar | Sept. 21, 1948 |
| 2,584,281 | Morlock | Feb. 5, 1952 |
| 2,697,202 | Squires | Dec. 14, 1954 |
| 2,722,656 | Marbury | Nov. 1, 1955 |
| 2,824,278 | Johnston | Feb. 18, 1958 |
| 2,886,246 | Gustaffsson et al. | May 12, 1959 |